(12) United States Patent
Hammerschmidt

(10) Patent No.: US 8,021,797 B2
(45) Date of Patent: Sep. 20, 2011

(54) BIPOLAR PLATE AND FUEL CELL COMPRISING SUCH A BIPOLAR PLATE

(75) Inventor: Albert Hammerschmidt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/275,662

(22) Filed: Nov. 21, 2008

(65) Prior Publication Data

US 2009/0075144 A1   Mar. 19, 2009

Related U.S. Application Data

(63) Continuation of application No. 10/557,528, filed as application No. PCT/EP2004/003922 on Apr. 14, 2004, now Pat. No. 7,468,216.

(30) Foreign Application Priority Data

May 26, 2003   (DE) .................................. 103 23 880

(51) Int. Cl.
*H01M 8/02* (2006.01)

(52) U.S. Cl. ........................ 429/518; 429/519

(58) Field of Classification Search .................... 429/34, 429/38, 39, 468, 518, 514, 519
See application file for complete search history.

(56) References Cited

U.S. PATENT DOCUMENTS

| | | |
|---|---|---|
| 6,203,936 B1 | 3/2001 | Cisar et al. |
| 6,232,010 B1 | 5/2001 | Cisar et al. |
| 6,291,093 B1 | 9/2001 | Kindler et al. |
| 6,713,205 B2 | 3/2004 | Meguriya et al. |
| 6,824,874 B1 | 11/2004 | Shah et al. |
| 6,828,055 B2 * | 12/2004 | Kearl ............................ 429/38 |
| 6,864,007 B1 * | 3/2005 | Iqbal et al. ................... 429/34 |
| 7,014,913 B2 * | 3/2006 | Pacetti ......................... 428/212 |
| 7,115,685 B2 * | 10/2006 | Wynne et al. ............ 525/326.2 |
| 2001/0026884 A1 | 10/2001 | Appleby et al. |
| 2002/0071978 A1 | 6/2002 | Bekkedahl et al. |

FOREIGN PATENT DOCUMENTS

EP    1 117 142 A1    7/2001

* cited by examiner

*Primary Examiner* — Stephen J. Kalafut

(57) ABSTRACT

The invention relates to a bipolar plate, for fuel cells, characterized in comprising a layer of a hydrophobic material which is soluble in a solvent, on the surfaces thereof. Water forms small droplets on the surfaces of the bipolar plate due to said layer, which are loosely held on the surface of the bipolar plate and which can be reliably removed from the fuel cell even with low flow speeds for the operating gases. The thickness of the layer and thus the hydrophobicity thereof and the electrical contact resistance between the bipolar plate and a contacting electrode may be adjusted in a simple manner, by varying the concentration of the hydrophobic material in the solvent.

15 Claims, 1 Drawing Sheet

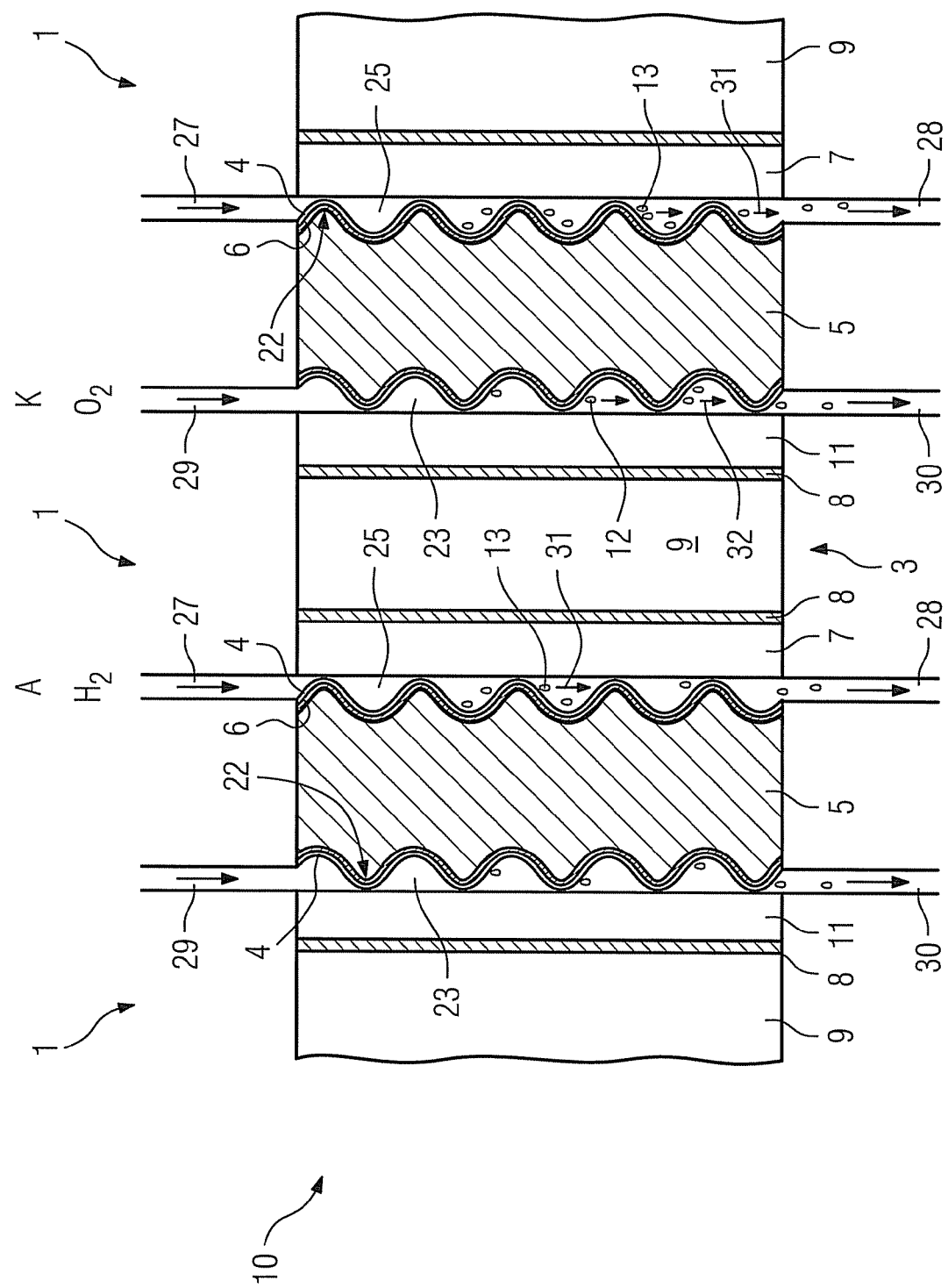

BIPOLAR PLATE AND FUEL CELL COMPRISING SUCH A BIPOLAR PLATE

CROSS REFERENCE TO RELATED APPLICATIONS

This application is a continuation of U.S. application Ser. No. 10/557,528 filed Oct. 06, 2006, now U.S. Pat. No. 7,468,216. This application is the US National Stage of International Application No. PCT/EP2004/003922, filed Apr. 14, 2004 and claims the benefit thereof. The International Application claims the benefits of German application No. 10323880.8, filed May 26, 2003. All applications are incorporated by reference herein in their entirety.

FIELD OF INVENTION

The invention relates to a bipolar plate for fuel cells and furthermore to a fuel cell comprising such a bipolar plate.

SUMMARY OF THE INVENTION

Fuel cells are becoming increasingly important in future-oriented concepts for generating energy. In particular low-temperature fuel cells based on Polymer Electrolyte Membrane (PEM) technology are being discussed as environmentally friendly and efficient energy converters for portable, mobile and stationary applications and are already finding initial commercial applications. At temperatures from just above freezing point to around 90° C. low-temperature fuel cells convert hydrogen and oxygen into electrical direct current, producing water as the only byproduct.

The major element of an individual PEM cell is a membrane electrode unit. This consists of two electrodes (an anode and a cathode) and of an electrolytic membrane situated between the two electrodes. Between the electrodes and the electrolytic membrane there is a catalyzer layer in which the main physical and electrochemical process, such as adsorption of hydrogen and oxygen at the catalyzer, emission and acceptance of electrons and the formation of water occurs on the cathode side through combination of protons diffused through the membrane and (reduced) oxygen.

Water or moisture is present in the fuel cell for a number of reasons: On the one hand water is produced as a product on the cathode side, in addition it can diffuse from the cathode side to the anode side as a result of a concentration gradient. A further important reason for the presence of water is that the media hydrogen and oxygen must be humidified up to 100% pure humidity, since only in this way is a good proton conductivity and a corresponding long-term stability of the proton-conducting membrane used produced.

The gases involved in the reaction are conducted by the electrodes; Simultaneously however the gaseous and especially liquid water which is formed in the operation of the fuel cell or is introduced into the fuel cell by the humidifying process of the gases, must be transported as quickly as possibly by the electrodes away from the electrochemically active catalyzer layer and out of the cell.

In a fuel cell stack the electrodes are located on the side facing away from the electrolytic membrane or catalyzer layer in contact with what is known as a bipolar plate or cooling unit in each case. The task of this component is to separate the individual fuel cells (on the media side) to look after flows of current in the cell stack and to remove the reaction heat. To guarantee and effective current flow, the bipolar plates consist of an electrically-conductive material which must exhibit a low contact resistance to the electrodes.

If there are low flow velocities of the operating gases hydrogen and oxygen or air in the fuel cell, as is especially the case for fuel cells operated with oxygen, and in this case again especially under part load operation, the problem arises of water not being able to be reliably transported out of the fuel cell, since it remains adhering to the surface of the bipolar plate and cannot be expelled from the fuel cell. This can adversely affect the current flow between the bipolar plate and the electrodes and thereby the power of the fuel cell.

It is therefore the object of the present invention to improve a bipolar plate such that water can also be securely removed from the fuel cell at only low flow velocities of the operating gases, with the contact resistance between the bipolar plate and an adjacent electrode not deteriorating or only deteriorating slightly.

This object is achieved by the claims. Advantageous embodiments are the object of the dependent claims in each case.

Through the inventive layer of hydrophobic material provided on the surface of the bipolar plate, water which comes into contact with the bipolar plate forms small droplets which only adhere loosely to the bipolar plate and can thus at only low flow velocity of a gas flowing past be taken up by the gas flow and removed from the fuel-cell.

Because of its solubility in a solvent the hydrophobic material can be applied in a dissolved state using a simple and normal application method, such as spraying, wiping, brushing, dipping, pressure etc. to the bipolar plate. After the vaporization of the solvent and if necessary immobilization of the remaining materials by a temperature step at increased temperature the desired layer from the hydrophobic material remains on the surface of bipolar plate.

With the aid of the concentration of the hydrophobic material in the solvent the thickness of the hydrophobic layer and thereby the hydrophobicity and the electrical contact resistance between the bipolar plate and an adjacent electrode can be adjusted in a simple way. A small concentration of the hydrophobic material in the solvent leads to a layer with low hydrophobicity and almost constant electrical contact resistance. A higher concentration of the hydrophobic material produces a correspondingly thicker layer with correspondingly higher hydrophobicity, but with a deterioration of the electrical contact resistance.

A desired lower electrical contact resistance is in this case solely obtained by the concentration of the hydrophobic material in the solvent and the layer thickness thus produced; Additional metallic components in the layer for reducing the contact resistance are not necessary nor is there provision for them.

The hydrophobic material preferably consists entirely or partly of an amorphous fluoropolymer. Amorphous fluoropolymers, e.g. amorphous modifications of TEFLON (PTFE), can be applied already dissolved in suitable solvents and thinned before use to an optimum concentration.

In a further advantageous embodiment of the invention there is provision for the hydrophobic material to consist entirely or partly of a polysiloxane compound or from alkylsilanes, especially alkyl-aryl-silanes or halogen alkyl-aryl-silanes. Such compounds also stand out by virtue of their good solubility in solvents and good adhesion to metal surfaces.

To simultaneously achieve just a slight effect on the contact resistance between the electrodes and the bipolar plate as well as a good removal of water from the fuel cell, an advantageous embodiment of the invention provides for the thickness of the layer of hydrophobic material to be set to an optimum between a low electrical contact resistance to an adjacent electrode and a high permanent hydrophobicity.

A low contact resistance and a simultaneous good hydrophobicity of the layer can be achieved by the hydrophilic layer having a thickness in the range of 0.1 nm to 50 nm, especially in the range 0.5 nm to 5 nm.

A reduction of the transfer resistance between the bipolar plate and the electrode is still possible by providing a highly-conducting contact layer, especially made of gold, between the bipolar plate and the layer of hydrophobic material.

The invention as well as further advantageous embodiments of the invention in accordance with features of the subclaims is explained in more detail below with reference to an exemplary embodiment in the FIGURE.

BRIEF DESCRIPTION OF THE DRAWING

The sole FIGURE shows an exemplary embodiment of the invention.

DETAILED DESCRIPTION OF INVENTION

The FIGURE shows a schematic and simplified presentation of a section through a stack 10 of low-temperature fuel cells 1. The stack 10 comprises a number of alternating bipolar plates 5 and membrane-electrolytic electrode units 3 stacked on top of each other. The membrane-electrolytic electrode units 3 each consist of an anode 7, a Polymer Electrolytic Membrane 9 and a cathode 11. A catalyzer layer 8 is located between the anode 7 or the cathode 11 and the membrane 9. The anodes 7 and cathodes 9 preferably consist of carbon paper. A bipolar plate 5 can also be embodied as a cooling card and to this end can feature a cavity through which cooling water flows.

The bipolar plates 5 advantageously consist of a metal alloy, especially a nickel-based alloy or a copper alloy and thereby exhibit a good electrical conductivity.

The bipolar plates 5 feature bumps 22 on their surface. These form cathode gas spaces 23 between a cathode 11 and an adjacent bipolar plate 5 which are connected to each other in each case (not shown) and allow a throughflow and a propagation of oxygen or air over the entire surface of the cathode. In a corresponding way anode gas spaces 25 are formed between an anode 7 and an adjacent bipolar plate 5, with the anode gas spaces 25 each being connected to each other (not shown) and allowing propagation of the hydrogen over the entire surface of the anode. At the points at which the bipolar plate 5 is in direct contact with an anode 7 or cathode 11, the electrical current flows between the two components.

During the operation of a fuel cell 1 wetted hydrogen flows from a feed channel 27 into the anode gas space 25 and is removed again via a discharge channel 28 from the fuel cell 1. In addition the oxygen or air wetted with water flows via a feed channel 29 into the cathode gas space 23 and is removed via a discharge channel 30 from the fuel cell 1.

On the electrode side the bipolar plates 5 feature on their surface a layer 4 of a hydrophobic materiel soluble in a solvent. Preferably this layer 4 consists entirely or partly of a amorphous fluoropolymer, especially an amorphous modification of TEFLON (PTFE) (for example an amorphous copolymer made of 65-99 Mol Perfluoro-2,2-Dimethyl-1,3-Dioxol with a complementary quantity of Tetrafluor ethylene available from DuPont Fluoroproducts under the product name TEFLON®AF). Alternatively the layer 4 consists of a polysiloxane compound or alkylsilanes, especially alkyl-aryl-silanes or halogen-alkyl-aryl silanes.

For improving the contact resistance between the bipolar plate 5 and the adjacent anode 7 or cathode 11 there is an additional highly-conductive contact layer 6 made of a noble metal between the hydrophobic layer 4 and the bipolar plate 5.

Through the water arising in the operation of the fuel cell or water introduced through the wetting process of the gases into the fuel cell 1 the bipolar plate 5 comes into contact with water both on the cathode side and also on the anode side. Because of the hydrophobicity of the layer 4 on the surface of the bipolar plate 5 the water forms droplets 12, 13 which are small and easily removable from the surface. The cathode-side droplets 12 can thus be transported at just a slight flow velocity of the oxygen or the air in the cathode gas space 23 in the flow direction 32 from this space and removed via the discharge channel 30 from the fuel cell. In a corresponding way the anode-side droplets 13 can also be transported at only a low flow velocity of the hydrogen in the anode gas space 25 in the direction of flow 31 out of this space and removed via the discharge channel 28 from the fuel cell.

The thickness of the hydrophobic layer 4 is in this case adjusted to an optimum between a low electrical contact resistance of the cathode 11 or the anode 7 to the bipolar plate 5 and a high hydrophobicity of the layer 4 and amounts to 0.5 nm to 5 nm. The layer thickness is adjusted in this case through corresponding thinning of the hydrophobic material in a suitable solvent.

A bipolar plate which makes reliable removal of water from the fuel cell and simultaneously a small electrical contact resistance to an adjoining electrode can be achieved by the following steps:

2.5 ml of a 6% (by weight) solution of TEFLON®AF 1601-56 from the manufacturer DuPont Fluoroproducts is added into a manufacturer-supplied solvent FC75 in a 500 ml measuring cylinder with a perhalogenated solvent FC77 (manufacturer:3M) to 500 ml and 12 stirred for 12 hours at room temperature using a magnetic stirrer. The solution is then ready for use and is applied to a cleaned and dried bipolar plate made of a nickel-based alloy, provided with a contact coating made of gold, using a sponge by even distribution. Subsequently the layer is dried for 30 minutes at 100° C. in the recirculating oven. A layer remains on the bipolar plate with of a thickness of appr. 0.6 nm.

Bipolar plates treated in this way exhibit by comparison with untreated plates a markedly different behavior in relation to water, since water applied to it forms droplets which only adhere slightly to the surface of the bipolar plate and can be blown away with only a slight gas flow.

With bipolar plates modified in this way short stacks are constructed with suitable membrane electrolytic electrode units and operated in hydrogen/oxygen mode. Characteristic fuel cell data such as for example a flow density of 1 A/cm2 at a voltage of 0.7 V for an individual cell for operating times of more than 1500 hours. The electrical data thereby differs from that of corresponding fuel cells which are operated with conventional bipolar plates. This shows that because of the small thickness of the hydrophobic layer the contact resistance between the bipolar plate and an adjoining electrode are not or are only very slightly influenced. In this case no accumulation of water can be established on the surface of the bipolar plate in this case. This shows that this water can be reliably discharged from the fuel cell.

What we claim is:

1. A bipolar plate for fuel cells, comprising:
   a substrate; and
   a layer having a thickness disposed on a surface of the substrate;

wherein the layer comprises a hydrophobic material; and
wherein the hydrophobic material consists of an amorphous fluoropolymer,
wherein the amorphous fluoropolymer is dissolved in a solvent for applying the hydrophobic material in a dissolved state to the bipolar plate,
wherein the amorphous fluoropolymer is modified to be depositable from the solvent such that after a vaporization of the solvent the hydrophobic material remains on the surface of the bipolar plate, and
wherein a thickness of the layer comprising the hydrophobic material is selected to provide an optimum between a low electrical contact resistance to an adjoining electrode and a high hydrophobicity to water droplets passing over the layer.

2. The bipolar plate of claim 1, wherein the thickness of the layer ranges from 0.1 nm to 50 nm.

3. The bipolar plate of claim 1, wherein the thickness of the layer ranges from 0.5 nm to 5 nm.

4. The bipolar plate of claim 1, wherein the substrate comprises a metallic alloy.

5. The bipolar plate of claim 4, wherein the metallic alloy is a nickel-based alloy.

6. The bipolar plate of claim 5, further comprising a conductive contact layer between the substrate and the layer, wherein the conductive contact layer is of a noble metal.

7. The bipolar plate of claim 6, wherein the noble metal is gold.

8. The bipolar plate of claim 1, wherein a contour of the surface of the substrate comprises a plurality of spaced-apart bumps, and wherein, when the substrate is in contact with the adjoining electrode, the plurality of spaced-apart bumps are configured to form a plurality of respective gap spaces between the substrate and the adjoining electrode.

9. A fuel cell, comprising:
a membrane-electrode unit; and
a bipolar plate electrically contacting the membrane-electrode unit on the electrode side, wherein the bipolar plate comprises:
a substrate; and
a layer having a thickness disposed on a surface of the substrate;
wherein the layer comprises a hydrophobic material; and
wherein the hydrophobic material consists of an amorphous fluoropolymer,
wherein the amorphous fluoropolymer is dissolved in a solvent for applying the hydrophobic material in a dissolved state to the bipolar plate, and
wherein the amorphous fluoropolymer is modified to be depositable from the solvent such that after a vaporization of the solvent the hydrophobic material remains on the surface of the bipolar plate, and
wherein a thickness of the layer comprising the hydrophobic material is selected to provide an optimum between a low electrical contact resistance to an adjoining electrode and a high hydrophobicity to water droplets passing over the layer.

10. The fuel cell as claimed in claim 9, wherein the thickness of the layer ranges from 0.1 nm to 50 nm.

11. The fuel cell as claimed in claim 9, wherein the thickness of the layer ranges from 0.5 nm to 5 nm.

12. The fuel cell as claimed in claim 9, wherein the substrate comprises a metallic alloy.

13. The fuel cell as claimed in claim 12, wherein the metallic alloy is a nickel-based alloy.

14. The fuel cell as claimed in claim 13, further comprising a conductive contact layer between the substrate and the layer, wherein the conductive contact layer is of a noble metal.

15. The fuel cell as claimed in claim 14, wherein the noble metal is gold.

* * * * *